US005737438A

United States Patent [19]
Zlotnick et al.

[11] Patent Number: 5,737,438
[45] Date of Patent: Apr. 7, 1998

[54] IMAGE PROCESSING

[75] Inventors: Aviad Zlotnick, Mitzpe Netofa; Ziva Sommer, Haifa, both of Israel

[73] Assignee: International Business Machine Corp., Armonk, N.Y.

[21] Appl. No.: 700,550

[22] PCT Filed: Mar. 7, 1994

[86] PCT No.: PCT/EP94/00667

§ 371 Date: Aug. 20, 1996

§ 102(e) Date: Aug. 20, 1996

[87] PCT Pub. No.: WO95/24278

PCT Pub. Date: Sep. 14, 1995

[51] Int. Cl.⁶ .......................................... G06K 9/00
[52] U.S. Cl. ........................ 382/101; 382/164; 209/584
[58] Field of Search ............................. 209/583, 580, 209/584; 382/101, 164, 176, 180, 291, 292, 308; 364/464.16; 348/91

[56] References Cited

U.S. PATENT DOCUMENTS 4,475,234  10/1984  Nishijima et al. ..................... 382/1
5,025,475  6/1991  Okabe .................................. 382/1
5,311,999  5/1994  Malow et al. ....................... 209/583

FOREIGN PATENT DOCUMENTS 39 42 932  6/1991  Germany ........................ B07C 3/06
3-91884  4/1991  Japan ............................... 382/101

OTHER PUBLICATIONS

Downton et al., "Pre-Processing of Envelope Images for Optical Character Recognition," 9th Int. Conf. on Pattern Recognition, IEEE, 1989, pp. 27–31.

*Primary Examiner*—Andrew W. Johns
*Attorney, Agent, or Firm*—A. Bruce Clay

[57] ABSTRACT

Image processing apparatus is disclosed for locating labels on images of parcels comprising: means to generate and store in digital form an image of the parcel comprising pixels arranged in rows and columns; classification logic for classifying each pixel as either a label pixel, a background pixel or neither, based on the pixel color; segmentation logic for reclassifying each pixel as either label or background based on its original classification and the classification of pixels in its neighborhood; and identification logic for identifying the boundaries of regions in which all pixels are classified as label pixels.

9 Claims, 3 Drawing Sheets

FIRST CLASSIFICATION 1 1 1 1 1 1 1 1 1 1 1 1 1 1 1 1 1 1 1 1
1 1 1 1 0 0 0 0 0 0 0 0 0 0 0 0 1 1 1 1
1 1 1 1 0 0 2 0 2 0 2 2 0 0 0 0 1 1 1 1
1 1 1 1 0 0 0 0 0 0 0 0 0 0 0 0 1 1 1 1
1 1 1 1 0 0 2 2 2 0 2 2 0 0 0 0 1 1 1 1
1 1 1 1 0 0 0 0 0 0 0 0 0 0 0 0 1 1 1 1
1 1 1 1 0 0 0 1 0 0 0 0 0 0 0 0 1 1 1 1
1 1 1 1 1 1 1 1 1 1 1 1 1 1 1 1 1 1 1 1
1 1 1 1 1 1 1 1 1 1 2 1 1 1 1 1 1 1 1 1
1 1 1 1 1 1 0 1 1 1 1 1 1 1 1 1 1 1 1 1
1 1 1 1 1 1 1 1 1 1 1 1 1 1 1 1 1 1 1 1
1 1 1 1 1 1 1 1 2 2 1 1 1 1 1 1 1 1 1 1
1 1 1 1 1 1 1 1 1 1 1 1 1 0 1 1 1 1 1 1
1 1 1 1 1 1 1 1 1 1 1 1 1 1 1 1 1 1 1 1

FIG. 3B

AFTER ROW SEGMENTATION

AFTER COLUMN SEGMENTATION

```
1 1 1 1 1 1 1 1 1 1 1 1 1 1 1 1 1 1 1 1
1 1 1 1 0 0 0 0 0 0 0 0 0 0 0 0 1 1 1 1
1 1 1 1 0 0 0 0 0 0 0 0 0 0 0 0 1 1 1 1
1 1 1 1 0 0 0 0 0 0 0 0 0 0 0 0 1 1 1 1
1 1 1 1 0 0 0 0 0 0 0 0 0 0 0 0 1 1 1 1
1 1 1 1 0 0 0 0 0 0 0 0 0 0 0 0 1 1 1 1
1 1 1 1 0 0 0 0 0 0 0 0 0 0 0 0 1 1 1 1
1 1 1 1 1 1 1 1 1 1 1 1 1 1 1 1 1 1 1 1
1 1 1 1 1 1 1 1 1 1 1 1 1 1 1 1 1 1 1 1
1 1 1 1 1 1 1 1 1 1 1 1 1 1 1 1 1 1 1 1
1 1 1 1 1 1 1 1 1 1 1 1 1 1 1 1 1 1 1 1
1 1 1 1 1 1 1 1 1 1 1 1 1 1 1 1 1 1 1 1
1 1 1 1 1 1 1 1 1 1 1 1 1 1 1 1 1 1 1 1
1 1 1 1 1 1 1 1 1 1 1 1 1 1 1 1 1 1 1 1
```

IMAGE PROCESSING

TECHNICAL FIELD

The invention relates to computerized mail sorting and, more particularly, to an image processing method and apparatus for identifying and locating labels on digitized images of parcels.

BACKGROUND ART

With the ever increasing volume of parcel mail, automating parcel sorting is becoming of vital importance to post offices around the world and to the transportation industry in general.

Generally, in order to automate parcel sorting, it is necessary to capture a digital image of the parcel and extract from the image routing information, such as the destination address. This routing information may then be used by appropriate apparatus to sort the parcel appropriately or to generate e.g. a bar code to be printed on the parcel for subsequent use in the sorting process.

However, the label may be located anywhere on the parcel and thus anywhere in the digital image of the parcel. Generally optical character reader (OCR) technology will be used to extract the routing information from a reasonably high resolution image of the label. In order to efficiently make use of this technology and avoid the processing of the whole of the image of the parcel, it is necessary to locate the label on the image of the parcel. Once this has been achieved it is only necessary to process the portion of the image corresponding to the label.

DISCLOSURE OF THE INVENTION

The object of the invention is the provision of an image processing apparatus for locating an address label in an image of a parcel.

Two kinds of problems must be solved to perform such label detection. First, achieving the required speed is very difficult. The image processing must be performed in real time with currently available technology. Second, the image data is not ideal: the label may be contaminated by noise, the label may be somewhat transparent and therefore corrupted by the parcel background, and text may appear both on the label and on the parcel itself. Moreover, the label may appear anywhere on the parcel.

To solve the above problems the invention enables image processing apparatus to be provided comprising: means to generate and store in digital form an image of the parcel comprising pixels arranged in rows and columns; classification logic for classifying each pixel as either a label pixel, a background pixel or neither, based on the pixel color; segmentation logic for reclassifying each pixel as either label or background based on its original classification and the classification of pixels in its neighborhood; and identification logic for identifying the boundaries of regions in which all pixels are classified as label pixels.

The invention is based upon the observations made by the inventors that almost all parcels have white labels with black text and that no parcels are as white as their labels. Therefore, color information may be used to separate the label from the background.

The pixels are initially classified as either being in the label, the background or neither. Typically the pixels classified as neither background nor label pixels will correspond to text on the label or the body of the parcel or be due to noise. A segmentation technique is then used to re-classify the pixels as either label or background pixels on the basis of their context. The segmentation technique can, for example, employ known features of the text, for example the fact that pixels corresponding to text will not form long runs either horizontally or vertically in the image. In addition the segmentation logic can make use of the fact that label pixels can be expected to occur in relatively long runs and that the occurrence of background pixels in the label is quite rare.

In one embodiment, the classification logic is arranged to classify white pixels as label pixels, black pixels as neither label pixels nor background pixels and all other pixels as background pixels. However there are other possibilities. For example schemes could be devised which employ labels of a particular predefined color. In this case, the apparatus would be adapted to identify and locate labels of that particular color from the parcel images. Furthermore, the possibility that pixels of more than one color all be classified as label pixels is not excluded.

The invention also provides apparatus for extracting routing information from parcels for subsequent use in sorting the parcels, comprising a camera for capturing parcel images; means to transport parcels past the camera; the above described image processing apparatus; means to generate images of parcel labels using the locations of the regions in which all pixels are classified as label pixels; and means to extract routing information from the images of the labels.

Viewed from another aspect the invention provides an image processing method for locating labels on images of parcels comprising:

(a) generating and storing in digital form an image of the parcel comprising pixels arranged in rows and columns;

(b) classifying each pixel as either a label pixel, a background pixel or neither, based on the pixel color;

(c) reclassifying each pixel as either label or background based on its original classification and the classification of pixels in its neighborhood; and (d) identifying the boundaries of regions in which all pixels are classified as label pixels.

Also provided is a method for parcel sorting including the above steps.

BRIEF DESCRIPTION OF THE DRAWINGS

An embodiment of the invention will now be described with reference to the accompanying drawings wherein:

FIGS. 3 a, b and c are illustrative of low resolution parcel images.

BEST MODE FOR CARRYING OUT THE INVENTION

The invention is embodied in a Shipping Label Translation System which extracts shipping information from labels on parcels using image capture, image processing and optical character recognition (OCR) technologies.

Figure 1:
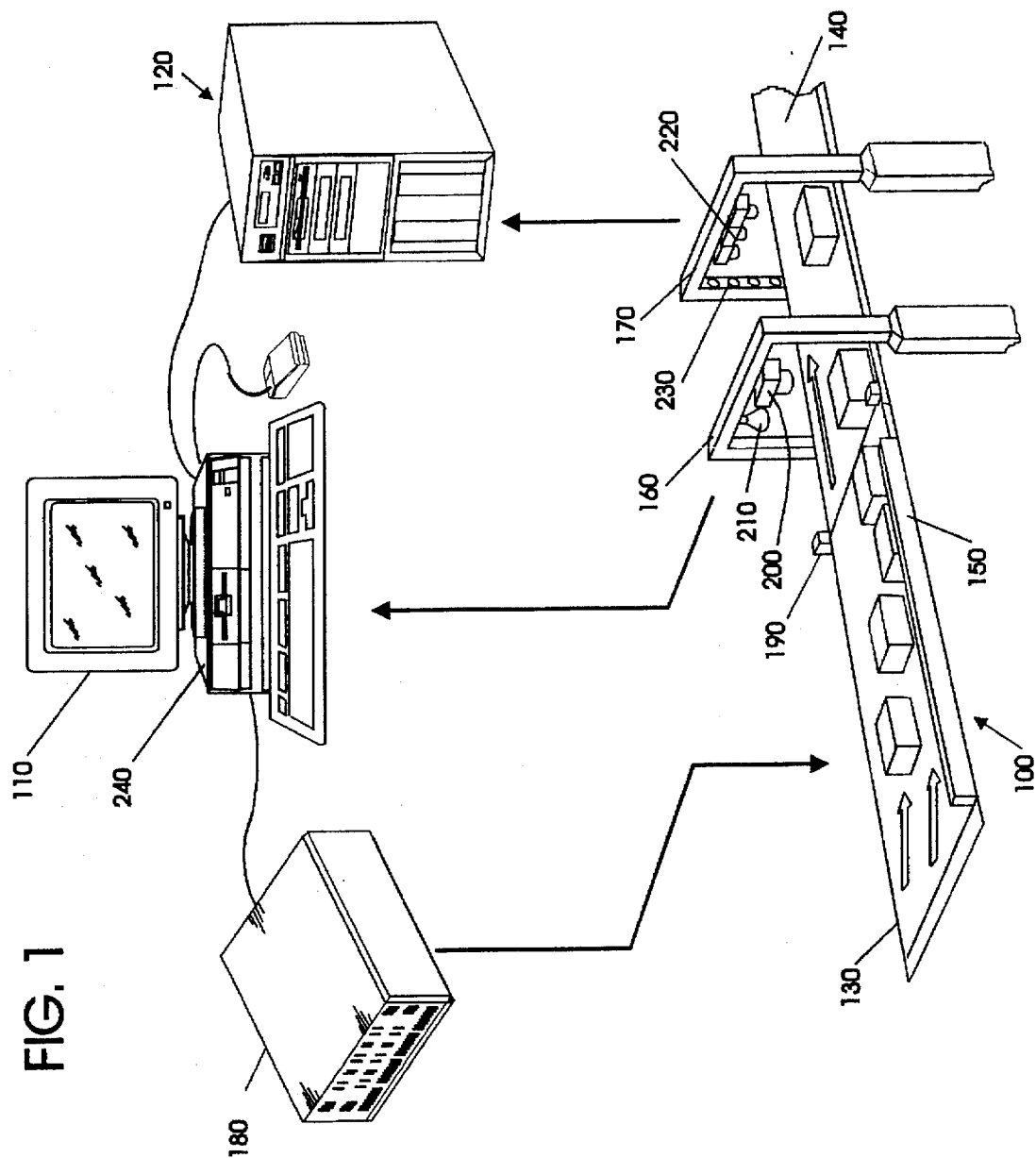
FIG. 1 is an overall view of a shipping label translation system.

The system is illustrated in FIG. 1 and comprises the following major components:

(a) Conveyor system 100, with low and high resolution image capture stations 160 and 170 respectively;

(b) Computer 110 operating under the control of a suitable program providing a user interface, overall system control and image processing functions;

(c) OCR Subsystem 120;

(d) Programmable logic controller 180 which enables the computer 110 to control the functioning of the conveyor and the image capture cameras.

Conventional components are used for the mechanical and image capture functions of the conveyor. Whilst modifications are required to handle the labels, the fundamental OCR building blocks, both hardware and software, are also conventional. Computer 110 could, for example, be one of the IBM RISC SYSTEM/6000 family of computers (IBM and RISC SYSTEM/6000 are trade marks of International Business Machines Corporation).

The data flow and major components shown in FIG. 1 are explained in the following sections through descriptions of the processing of packages.

The conveyor system 100 for the Shipping Label Translation System consists of two separate conveyor modules; an induction conveyor 130 and a process conveyor 140.

The induction conveyor 130 loads packages into the system. Packages are "skewed" to one side of the conveyor along an aligning edge 150 as they travel down the belt. This provides a constant location for the packages as they travel through the system. The "skewing" of packages to one side of the conveyor can be accomplished by providing an angled belt conveyor in the horizontal plane, or by providing a decline belt conveyor, in which packages will be transferred to the one side of the conveyor by gravity. The angled horizontal belt is illustrated in FIG. 1.

The process conveyor 140 is a continuous running belt conveyor that carries the packages through the two image capture stations 160 and 170.

Conveyor speed control is provided by the Programmable Logic Controller (PLC) 180. The PLC 180 is connected to and operates under the control of the computer 110. The control system design provides the means to select conveyor speeds through options provided by a control program executing on computer 110.

It will be understood that different modes of system operation, such as maintenance, test, etc., require configurable conveyor speeds. The controller 180 also monitors a series of photoeyes to track packages through the system and also provide package "jam" detection. The Gap Photoeye 190 shown in FIG. 1 provides feedback for the gap between packages and act as the gate between conveyor modules.

The operator places parcels on the conveyor 100 one by one with the labels face up. The operator is not required to rotate the parcel so that the label is in a fixed orientation.

Control over the gap between packages is provided to allow time to adjust focus of the high resolution cameras for packages of different heights and the package feed rate to be matched to the image processing capacity of the system.

To provide this gap, a stop/start conveyor section 130 is used at the package loading point. Packages are released from conveyor to a constant speed conveyor 140 under control of suitable software in the computer 110, which monitors the conveyor sensors through Programmable Logic Controller 180.

The gap mechanism can be used to temporarily stop feeding packages if a delay is required, e.g. for handling rejects. This mechanism could be eliminated at the expense of reduced throughput by having the operators place packages farther apart.

The package passes through a stage in which a standard TV camera 200 mounted at a fixed height over the conveyor belt captures a color image of the top of the package. Illumination is provided through a strobe light 210 to eliminate blur from package movement. The camera lens has sufficient depth of field to handle the range of package sizes required and therefore does not require focus control.

The TV camera is connected to a video capture board of known type in the computer 110 and stored in digital form in a storage device in the computer. Suitable software in the computer 110 analyzes the digital form of the low resolution image to perform the following functions:

(a) Determining package dimensions and orientation on the belt.

(b) Label detection.

(c) Locating an open area on the package for later application of a label.

It is possible to use a number of techniques to determine the package height from the TV image itself. For example, the length of a package along the belt path can be measured by a simple photosensor and contrasted with the length of the package in pixels in the TV image: the package appears longer in the TV image if its top surface is closer to the camera. Alternatively, the package height could be determined via discrete sensors, for example, a photocell array looking across the belt, or sonic sensors mounted overhead on the frame containing the TV camera, or the like.

The package boundaries can be readily determined within the TV image by detected the color shift from the package to the belt. Top surface dimensions and orientation can then be determined. The package height information is used in conjunction with the top view dimensions to compute the smallest bounding box that can surround the parcel.

The information needed for parcel routing is contained in the labels of the parcels. In order to facilitate easy access to this information, computer 110 is programmed to extract the location of the label from the low resolution images of the parcels.

Labels are located in the low resolution images of the parcels through analysis of their color differences compared to the parcel background. In this embodiment, the location and orientation information is used to define the areas for which high resolution images are captured downstream.

In this embodiment, parcels can be processed by the system at the rate of one per second, or 3600 per hour. This processing includes image capture, label detection, rotation detection, deskewing, and OCR or manual extraction of routing information from the label images. In order for all these operations to be completed image capture and label detection should not take longer than 200 ms.

Two kinds of problems have been solved to perform such real time label detection at reasonable cost with currently available technology. First, achieving the required speed is very difficult, since transferring image data from the image capture board to the host for processing takes more than 200 ms. Second, the image data is not ideal: the label's white color may be contaminated by noise, the label may be somewhat transparent so the parcel background corrupts the white color, and the black color of the text on the label is not exclusive to the label. Moreover, the label may appear anywhere on the parcel.

The processing of the low resolution parcel image proceeds as follows.

The TV camera 200 generates a 640×480 pixel image. Every 10th line in this image is transferred from the video capture card to the computer memory totaling approximately 50 ms. This results in a significantly subsampled image, but in reasonable time.

To solve the detection problem, a function has been found that estimates the likelihood of every pixel in the image to be in the label. A one dimensional segmentation algorithm is then employed on each of the two major axes of the image to obtain a clear distinction between the label and the rest of the parcel.

This technique is described in more detail below.

Figures 2, 3A:
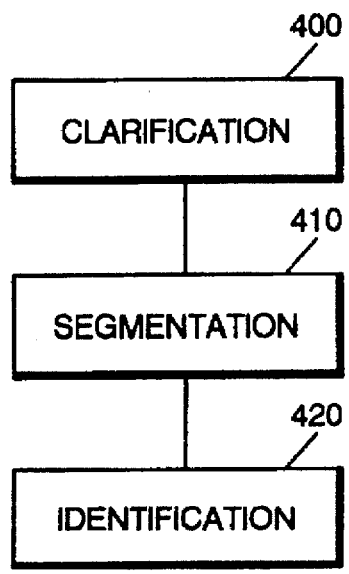
FIG. 2 is a schematic diagram showing image processing apparatus.

The processing of the subsampled parcel image is shown schematically in FIG. 2. First, a classification 400 is carried out. The pixels in the image are classified into three classes: Label, Background and Neither. Each pixel is first classified as one of these, disregarding its neighbors.

(a) Label type pixels: These are the white pixels. It is assumed that although such pixels may occur anywhere on the parcel, they are concentrated in long runs (both horizontally and vertically) in the label area.

Neither type pixels: These are the black pixels. It is assumed that such pixels can occur both in the label area and in the background area, but in the label they do not form many long runs either horizontally, or vertically, or both.

(c) Background type pixels: All the other pixels. It is assumed that the occurrence of such pixels in the label is quite rare.

The classification 400 consists of two stages:

(a) Color space transformation:

The original RGB image is transformed to YUV image, where Y is the luminance component and U, V are the chrominance components. The transformation equations are the following:

$$Y = 0.299 * R + 0.587 * G + 0.114 * B$$

$$U = B - Y$$

$$V = R - Y$$

(b) Color classification:

In the YUV space gray levels are designated by low values of the chrominance components (U, V). Among these colors, white colors are defined by high values of the luminance component, Y, and black colors by low values.

For each pixel, the chrominance components are first checked. If at least one of them is high, the pixel's color is not grey and it is classified as Background. If both components have low values the luminance value is checked. If it is high, the pixel's color is white and it is classified as Label. If it is low, the pixel's color is black and it is classified as Neither type pixel. Pixels having middle range values of luminance are also classified as Background.

Subsequently, a segmentation process 410 is applied first to each row, and then to each column. This process segments the row/column to Label, Background, or Neither regions, subject to constraints on the region measures. As a result of the segmentation, pixels are re-classified to the categories above, but this time the surrounding context is taken into account. In FIGS. 3a, 3b, and 3c, 0 designates Label (white pixels), 1 designates Background pixels, and 2 designates Neither type pixels.

FIG. 3a shows the pixel classification before segmentation.

FIG. 3b shows the classification after row segmentation. FIG. 3c shows the classification after column segmentation. In this embodiment, it was assumed that the segmentation constraint is that a run of pixels of any type should be at least three pixels long.

2. Segmentation. The segmentation logic used in the preferred embodiment of this invention is described below The algorithm processes an array of symbols A( ). Three symbols are used representing two properties of interest (the '1' and '0' symbols—in this case the background pixels and the white pixels respectively—and a lack of both (the '*' symbol)—in this case the black pixels.

A( ) is produced by the classification process, which is not 100% correct. The segmentation process relies on the assumption that in the 100% correct classification of pixels the symbols do not occur isolated, but rather in runs.

The segmentation logic scans A( ), and maintains three hypotheses as to the type of run that is reflected by A( ). Each of these hypotheses has a score, and when the score of a hypothesis is higher than an experimentally determined threshold, that hypotheses is accepted and forms the output.

Specifically, each hypothesis has the following variables:

Type:—0, 1, or *;

Score:—representing the quality of match between the segmentation result and the data in A( );

Run_score:—representing the quality of match between the last segmented run and the corresponding elements in A( );

Increment:—the increment to the score if the next element in A( ) matches the hypothesis type;

Start:—the index in A( ) in which a run of the hypothesis type is assumed to have started;

Prev_len:—the length of the last run of this type.

Let A( ) be a(0) . . . a(n-1). The processing proceeds as follows:

1. Initialize:
score(0)=run_score(0)=increment(0)=start(0)=prev_len(0)=0;
score(1)=run_score(1)=increment(1)=start(1)=prev_len(1)=0;
score(*)=run_score(*)=increment(*)=start(*)=prev_len(*)=0;
current_state=2;

2. Loop on steps 3 to 7 for all A( ) elements: for I in (0 . . . n-1)

3. Score buildup and previous length maintenance: for each hypothesis x in (01*)
if (a(I) matches x)
(
if (increment(x)==0)prev_len(x)=0;
increment(x)=increment(x)+1;
score(x)=score(x)+increment(x);
run_score(x)=run_score(x)+increment(x);
}
else
(
if (increment(x) !=0)prev_len(x)=increment(x);
increment(x)=0;
}

4. Starting point update
for each hypothesis x in (0 1*)
if (a(I) matches x and start(x)<0) start(x)=I;

5. Hypothesis acceptance
y=MaxArg(score(x), x in (0 1*)}
if (run_score(y)>threshold(y))
(
current_state=y;
for j=start(y); while j<=I; j=j+1
a(j)=y;
break;
}

6. Normalization
if (current_state !=* && a(I) !=*)
increment(*)=increment(1-current_state);
if (run_score(current_state)>threshold(current_state))
run_score(0)=run_score(1)=run_score(*)=0;

7. Score Tracking
for x in (0 1*)

```
if (increment(x)==0 && score(x)<score(current_
    state))
(
score(x)=score(current_state);
run_score(x)=0;
start(x)=-1;
}
```
8. End of Loop The term 'a(I) matches x' in the above algorithm includes the case where a(I)=* and also the case where a(I) !=current_state, and increment (a(I))<prev_len(x) for x !=a(I).

It will be understood that it is possible to subsample the image in many ways other than at every tenth line as in this embodiment. It is also possible to vary the sampling density according to observed Label type pixels: a high sampling density in the vicinity of such pixels, low density elsewhere.

A by-product of the label detection analysis is the identification of the featureless areas on the parcel top surface, one of which is reported as the open area for application of the label.

The package next passes through a stage in which high resolution (200 DPI grey scale) images of the label areas are captured, using standard 2048 element line scanners 220. Since the field of view for a single line scanner is approximately 10 inches (2048/200 DPI), two alternatives providing coverage of the overall package width are possible.

(a) Three line scan cameras, each covering ⅓ of the belt width, with slightly overlapped fields of view, and each with its own lens. With this arrangement, the number of "candidate" labels is not limited by the scanner configuration. This configuration, however, requires a software "stitching" operation to be performed on label images which are split across two scanners.

(b) Multiple line scan cameras which pivot to look at a 10 inch area containing candidate labels. Two cameras guarantee that images from any two candidate labels can be captured regardless of label location. Additional candidate labels within the same 10 inch swathes can also be covered. Pivoting the cameras introduces some predictable image distortion that software must compensate for.

With either approach, a motor-driven focus adjustment is provided for the camera lens, to compensate for different package heights.

Illumination for the line cameras is provided as a continuous strip of light 230 across the belt.

The 200 DPI 4-bit grey scale image for each label is passed to the OCR Subsystem 120 from the appropriate scanners based on knowledge of the positions of the labels obtained from the low resolution images.

The high resolution label images are processed by OCR subsystem 120 in a known manner to extract routing information from the text printed on the labels.

Finally, the routing information can be forwarded to an application that will apply a label with a mechanism further downstream on the conveyor system.

Industrial Applicability

The invention can be applied to the field of computerized parcel sorting apparatus including image processing apparatus for identifying and locating labels on digitized images of parcels.

We claim:

1. Image processing apparatus for locating labels on images of parcels comprising:

means to generate and store in digital form an image of the parcel comprising pixels arranged in rows and columns;

classification logic for classifying each pixel as either a label pixel, a background pixel or neither, based on the pixel color;

segmentation logic for reclassifying each pixel as either label or background based on its original classification and the classification of pixels in its neighborhood; and identification logic for identifying the boundaries of regions in which all pixels are classified as label pixels.

2. Image processing apparatus as claimed in claim 1 wherein the segmentation logic is arranged to identify runs of pixels in a linear array of pixels which should have the same classification, to determine whether all pixels in the run should be classified as label pixels or background pixels based on the classifications of the pixels therein and to reclassify the pixels in the run not classified as label pixels or background pixels accordingly.

3. Image processing apparatus as claimed in claim 2 wherein the segmentation logic is arranged to process the image row by row and then column by column or vice versa.

4. Image processing apparatus as claimed in claim 1 wherein the classification logic is arranged to classify white pixels as label pixels, black pixels as neither label pixels nor background pixels and all other pixels as background pixels.

5. Image processing apparatus as claimed in claim 1 comprising a camera for capturing the image.

6. Image processing apparatus as claimed in claim 5 comprising means to subsample the image generated by the camera.

7. Apparatus for extracting routing information from parcels for subsequent use in sorting the parcels, comprising a camera for capturing parcel images; means to transport parcels past the camera; and image processing apparatus comprising: means to receive a signal from the camera and generate and store in digital form an image of the parcel comprising pixels arranged in rows and columns; classification logic for classifying each pixel as either a label pixel, a background pixel or neither, based on the pixel color; segmentation logic for reclassifying each pixel as either label or background based on its original classification and the classification of pixels in its neighborhood; and identification logic for identifying the boundaries of regions in which all pixels are classified as label pixels; means to generate images of parcel labels using the locations of the regions in which all pixels are classified as label pixels; and means to extract routing information from the images of the labels.

8. Image processing method for locating labels on images of parcels comprising:

(a) generating and storing in digital form an image of the parcel comprising pixels arranged in rows and columns;

(b) classifying each pixel as either a label pixel, a background pixel or neither, based on the pixel color;

(c) reclassifying each pixel as either label or background based on its original classification and the classification of pixels in its neighborhood; and (d) identifying the boundaries of regions in which all pixels are classified as label pixels.

9. Method for parcel sorting comprising transporting parcels past a camera; generating and storing in digital form an image of the parcel comprising pixels arranged in rows and columns; classifying each pixel as either a label pixel, a background pixel or neither, based on the pixel color; reclassifying each pixel as either label or background based on its original classification and the classification of pixels in its neighborhood; identifying the boundaries of regions in which all pixels are classified as label pixels; generating images of parcel labels using the locations of the regions in which all pixels are classified as label pixels; extracting routing information from the images of the labels; and sorting the parcels using the routing information.

* * * * *